3,708,350
COATED METAL AND METHOD
Alexander W. Kennedy, Chardon, and Irving Malkin, University Heights, Ohio, assignors to Diamond Shamrock Corporation, Cleveland, Ohio
No Drawing. Continuation-in-part of abandoned application Ser. No. 788,334, Dec. 31, 1968. This application Dec. 10, 1970, Ser. No. 96,968
Int. Cl. C23f 7/26
U.S. Cl. 148—6.2           9 Claims

ABSTRACT OF THE DISCLOSURE

A composite coating provides enhanced corrosion protection for metal substrates and can maintain substrate electroconductivity, e.g., for weldability. The undercoating on the surface of the substrate is a residue obtained from curing an applied corrosion-resistant, hexavalent-chromium-containing liquid composition containing chromic acid. The coating over such residue results from curing an applied topcoat composition comprising an electrically conductive pigment in a vehicle.

CROSS REFERENCE TO RELATED APPLICATION

This application is a continuation-in-part of U.S. application Ser. No. 788,334, filed Dec. 31, 1968, now abandoned.

BACKGROUND OF THE INVENTION

Hexavalent-chromium-containing liquid compositions are often applied to metal surfaces as dilute chromic acid treatments to typically impart enhanced corrosion resistance to sometimes precoated and often heated metal surfaces. Such coatings have been shown for example, in U.S. Pats. 3,210,850, 2,777,785, and 2,762,732. These rinsing and treating compositions may contain some trivalent chromium, or the compositions can form trivalent chromium compounds during application and/or curing. Without more, i.e., without some underlying metal surface coating such as taught in U.S. Pat. 2,777,785, the resulting treated metal surfaces can display initial, very limited corrosion resistance, but under vigorous conditions, such as extended exposure to moist, salty air, such protection is of undesirably short duration.

The coating of weldable metal substrates with so-called "welding primers" containing electrically conductive pigments offers coating protection for such substrates prior to subsequent welding operation. Otherwise it has generally been necessary to coat substrates susceptible to welding operations only after the completion of such welding. Additionally, these primers containing pigments such as finely-divided carbon or magnetite, or a particulate metal, e.g., zinc, copper, cadmium, or aluminum and which primers have high pigment concentrations, for example, up to about 96 weight percent of pigment, can provide some corrosion protection for the substrate metal. Therefore, such primers may be employed on metal substrates where no subsequent welding operation is contemplated. But, under conditions such as continued exposure to moist, salty air these primers may offer corrosion resistance of an only limited duration.

SUMMARY OF THE INVENTION

It has now been found that when uncoated surfaces of metal substrates are treated with hexavalent-chromium-containing liquid compositions containing chromic acid, and the resulting treated surface that can result therefrom is topcoated with an applied and cured welding primer, such ensuing surface has excellent, augmented corrosion resistance of unexpected superiority in view of the expected protection to be obtained by the additive effects of the individual treatment and coating themselves.

Additionally, because of this enhanced protection under corrosive conditions, thin coating films may now be employed without sacrifice in corrosion protection. These thin films are highly desirable for application to a metal substrate which will later be subjected to metal forming operations, for example, metal stamping. During extended stamping thin films result in retarded die buildup, i.e. lead to a significant reduction, to virtual elimination, of deleterious film removal during stamping. Moreover, this invention can maintain substrate electroconductivity, e.g., for weldability or deposition of electrocoat paint, Further, after application to weldable substrates, extended electrical resistance welding free from film pick-up on the electrodes; for example, up to 2,000 production spot welds between electrode cleaning may be achieved.

Broadly, the present invention is directed to a metal substrate having at the surface thereof an adherent, corrosion-resistant coating which comprises: (1) an undercoating comprising the residue obtained by applying to such surface a hexavalent-chromium-containing liquid composition for metal substrates containing hexavalent-chromium-providing material supplied by at least about 80 weight percent chromic acid, in liquid medium, the liquid composition providing the residue with not above about 500 milligrams per square foot of coated substrate of chromium, and heating such substrate at a temperature, and for a period of time, sufficient to vaporize volatile substituents from the liquid composition and deposit on the surface such residue; and (2) a topcoating from an applied topcoating composition comprising a particulate, electrically conductive pigment in a vehicle, wherein such electrically conductive pigment is selected from the group consisting of aluminum, copper, cadmium, magnetite, carbon, and zinc.

Additionally, the present invention relates to preparing a metal substrate exhibiting the above-described adherent, corrosion-resistant coating. It is further directed to welded and electrocoated articles and to their production.

The metal substrates contemplated by the present invention are exemplified by the metal substrate to which a chromic acid/t-butanol, or chromic acid/water coating may or can be applied for enhancing corrosion resistance of such substrate metals. For example, such metal substrates may be aluminum and its alloys, zinc and its alloys, copper and cupriferous, e.g., brass and bronze. Additionally, exemplary metal substrates include cadmium, titanium, nickel, and its alloys, tin, lead, chromium, magnesium and alloys thereof, and for weldability, preferably a ferrous metal substrate such as iron, stainless steel, or steel such as cold rolled steel or hot rolled and pickled steel. All of these for convenience are usually referred to herein simply as the "substrate."

For convenience, the hexavalent-chromium-containing liquid compositions are often referred to herein as "treating compositions" and the "residue" on a metal surface is such resulting surface condition obtained after application of such composition to, and heating resulting applied composition on, a metal substrate.

DESCRIPTION OF THE PREFERRED EMBODIMENTS

The corrosion-resistant, hexavalent-chromium-containing liquid composition contains chromic acid as the hexavalent-chromium-providing substance or its equivalent, for example, chromium trioxide or chromic acid anhydride. But a minor amount, e.g., 20 percent or less, of such chromium can be supplied by a salt such as ammonium dichromate, or by sodium or potassium salts, or by substances such as calcium, barium, magnesium, zinc, cadmium, and strontium dichromate. Additionally, a minor amount such as 20 percent or less of the hexavalent-chromium-providing substance might be a mixed chromium compound, i.e., include trivalent chromium compounds. Although the liquid composition might contain as little as about 0.25 weight percent of hexavalent chromium, expressed as $CrO_3$, and may contain as much as about 500 grams per liter of composition of hexavalent chromium, expressed as $CrO_3$, such composition typically contains from about 1 up to about 10 weight percent of hexavalent chromium, expressed as $CrO_3$.

For supplying the liquid medium, although the water and t-butanol are miscible in all proportions, where t-butanol supplies the preponderant amount of the liquid medium preferably only a very minor amount of the medium is water or water plus other liquid material to enhance corrosion resistance of final coated substrates. Thus, liquid mediums which are preponderantly t-butanol advantageously contain less than about 10 percent and preferably are virtually to completely water free. For economy, where water supplies the preponderant amount of the liquid medium, the balance of the medium advantageously contains less than about 25 percent of other liquids such as t-butanol, or hydrocarbons, and preferably, for enhanced economy, these liquids are present in an amount of less than about 15 percent by volume, or may be completely absent.

The liquid medium may also be preponderantly an inert organic liquid or blend of liquids, i.e., not readily oxidized in solution by chromic acid. Organic liquids have been discussed, for example, in U.S. Pats. 2,762,732 and 3,437,531. Tertiary alcohols are present in such blends in typically at least twice the amount, on a molar basis, as the amount of chromic acid to insure solution of such acid. Suitable inert liquids that have been, and may be, used include hydrocarbons such as benzene and pyridine and halogenated hydrocarbons such as trichlorethylene and carbon tetrachloride.

The liquid compositions may be applied to the metal substrate by any conventional method for coating a substrate with a liquid, for example, dip coating, roller coating or reverse roller coating, curtain coating, airless spray, rotary brush coating, pressure spray, or combinations of such techniques as, for example, spray and brush techniques. Typically the liquid composition is applied to a metal surface by simply dipping the metal article into the composition.

The metal surface can be a preheated metal surface to assist in the curing of the composition, or such liquid composition or dispersion may be applied to the metal surface after an etch, e.g., a nitric acid etch, or may be applied from a heated bath, for example, one heated up to 200° F. The liquid compositions can contain up to, for example, about 5 weight percent of a surface active agent, and these can include dispersion agents, suspending agents, defoaming agents, and wetting agents, referred to herein for convenience simply as surface active agents. They may be present in as little as 0.001 weight percent.

Such agents may typically be a hydroxyl-containing hydrocarbon ether which includes the alkyl ethers of alkylene glycols, such as butyl ether of propylene glycol, the oxyalkyl ethers of alkylene glycols, e.g., 1-butoxyethoxy-2-propanol, fatty alcohol polyoxyalkylethers, alkylphenol polyoxyalkylethers such as polyoxyethylated nonylphenols, and polyalkylene glycols, e.g., tetraethylene glycol. Other suitable surface active agents which may be used include products prepared from waste sulfite liquors such as lignin sulfonic acids and products from pine wood distillation, e.g., pine oil.

The resulting coating weights on the metal substrate may vary to a considerable degree but the residue will most typically always be present in an amount supplying above about 5 milligrams per square foot of chromium, expressed as chromium and not $CrO_3$. If the coated metal substrate is to be subsequently formed, the residue should contain not substantially above about 150 milligrams per square foot of chromium as the coating may be subjected to cracking or crazing during forming operation, although when subsequent forming is not contemplated, and extended corrosion resistance may be desirable, such residue may contain up to about 500 milligrams per square foot of chromium.

Other compounds may be present in the hexavalent-chromium-containing liquid composition, but, even in combination, are present in very minor amounts so as not to deleteriously affect the coating integrity, e.g., with respect to weldability and galvanic protection. Thus, such compositions should contain 0–40 grams per liter of resin, i.e., are substantially resin-free, and contain 0–40 grams per liter of pigment. Since excellent adhesion of the residue to the metal substrate is achieved without need for resins, such coating compositions are preferably resin-free.

These other compounds further include inorganic salts and acids as well as organic substances, often typically employed in the metal coating art for imparting some corrosion resistance or enhancement in corrosion resistance for metal surfaces. Such materials include acids of phosphorous such as phosphoric acid, zinc chloride, magnesium chloride, various chromates, e.g., strontium chromate, molybdates, glutamic acid, fluoridic acid, succinic acid, zinc nitrate, succinimide, and polyacrylic acid and these are most usually employed in the liquid composition in amount totaling less than about 15 grams per liter.

For the metal substrates containing applied liquid composition and which will be topcoated by a weldable primer that is not baked but rather cured by drying as will be more particularly discussed hereinbelow, these are heated before topcoating. Otherwise, they are usually dried without heating and thereby establish a dried residue that is then topcoated with a weldable primer, and the total coating heated for curing the undercoating and the topcoating. When the undercoating is cured before application of weldable primer, the preferred temperature for the heating, also often referred to as baking, and that may be preceded by drying such as air drying, is within the range from about 375° F. but more typically from about 425° F. at a pressure of 760 mm. Hg up to above about 900° F. Such an elevated substrate temperature may be attained by preheating the metal prior to application of the liquid comosition. However, such curing temperatures do not often exceed a temperature within the range of about 450°–550° F. At the elevated curing temperatures the heating can be carried out in as rapidly as about 0.2 second or less but is often conducted for several minutes at a reduced temperature.

Before starting the treatment of the present invention it is, in most cases advisable to remove foreign matter from the metal surface by thoroughly cleaning and degreasing. Degreasing may be accomplished with known agents, for instance, with agents containing sodium metasilicate, caustic soda, carbon tetrachloride, trichlorethylene, and the like. The use of a commercial alkaline cleaning composition which combines washing and mild abrasive treatments can be employed for cleaning, e.g., an aqueous trisodium phospate-sodium hydroxide cleaning solution. In addition to cleaning, the substrate can undergo cleaning plus etching, for example, with a hydrofluoric acid etching agent.

The undercoating residue is topcoated with a "weldable primer" containing an electrically conductive pigment in a vehicle. More particularly, the welding primers are coating compositions containing a particulate, electrically conductive pigment of aluminum, copper, cadmium, steel, carbon, zinc, or magnetite, i.e., the magnetic oxide of iron, and including mixtures thereof such as of aluminum flake and zinc powder. Generally, the carbon pigments, e.g., channel blacks or furnace blacks, are the most finely divided of these electrically conductive pigments, often having particle size of 0.01 micron for the intensely black pigments. Comparatively, the finely divided aluminum powders have flake thicknesses for the finest grades of about 0.25 micron. These aluminum pigments can be typically produced by stamping, generally of small pieces of aluminum foil, or by ball milling atomized aluminum formed by air blasting a molten aluminum spray. Typically a finely divided zinc pigment is a distilled zinc dust or particles prepared by atomizing molten zinc in an air stream. Particle size for distilled zinc powders often average from about 2 to about 6 microns with generally about 99 weight percent or better passing a 240 mesh U.S. Standard Sieve.

Since these primers generally are applied preparatory to subsequent welding of the substrate, they must contain a substantial amount of the electrically conductive pigment, e.g., at least about 30 volume percent pigment for the zinc-rich primers and often more than about 65 percent by volume of particulate pigment, but on a weight basis, because of the density of the zinc, these primers can contain up to about 98 weight percent of such pigment.

For formulating the weldable primers, the binder component can be made up of resins specially selected to afford particular characteristics to the applied coating. Thus the binder components for the zinc-rich primer having the greatest adhesion are polyamide resins combined with epoxy resins, although other binder materials have been found to be compatible with particulate zinc pigment, e.g., polystyrene, chlorinated or isomerized rubber, polyvinyl acetate and polyvinyl chloride-polyvinyl acetate copolymers, alkyd/melamine, and epoxy esters including epoxy ester medium oil content linseed oil. Additionally the formulations can contain flow control agents, as for example urea formaldehyde resins, thixotroping agents such as silica and organic derivatives of magnesium montmorillonite, and anti-settling agents particularly for the aluminum and zinc primers which agents include hydrogenated castor oil and aluminum stearate. Also for the aluminum and zinc primers where gassing can be a problem, a gas inhibiting substance such as lime or calcium oxide is generally included in the formulation. Also, these primers usually contain, and/or are typically cut back after formulation but before application with, petroleum derived hydrocarbon liquids such as toluene, benzene, xylene, and synthetically prepared aromatic solvent blends from petroleum. Zinc-rich weldable primers have been more extensively reviewed in an article entitled "Zinc-Rich Paints" in Paint and Varnish Production, April, 1964, p. 35 f.; May, '64, p. 87 f.; and June, '64, p. 47 f.

The final make up of the primer can be dependent upon the method of application of the primer to the treated metal substrate. Typically for primers containing zinc dust or combinations of zinc dust with aluminum flake, or zinc flake with aluminum flake and the like, where such primers are spray applied to the metal substrate they may contain between about 50-80 weight percent of the pulverulent metal and between about 10-30 weight percent of binder. Also such primers generally are formulated with a few weight percent or less of a thixotroping agent, and often with a half weight percent or less of a metallic drier, e.g., a lead, manganese, cobalt or other metallic salt of organic acid, and typically 10-30 weight percent of petroleum derived hydrocarbon liquid.

However, for such primers which are electrically deposited, they typically contain, based on the weight of the total paint solids, 40-65 weight percent of electrically conductive pigment, e.g., zinc flake or combinations of zinc and aluminum flake, as well as 20-40 weight percent binder plus 5-25 weight percent of one or more extender pigments. However, on a basis of the overall coating bath, such electrodeposited primers can typically contain greater than about 80 weight percent of water medium supplied by deionized water to avoid any reactions between the electrically conductive pigment and water. Additionally, in the overall coating bath, there is usually present in very minor amounts; e.g., a half percent or less, a pigment dispersing agent, such as a comparable amount of surfactant, as well as slightly greater amounts of organic solvent, supplied for example by a petroleum distillate.

For example electrically deposited primers, the extender pigment, e.g., rutile or anatase titanium dioxide, zinc oxide, leaded zinc oxide or the like, is included to enhance the uniformity of the deposited primer film. Also, the binders used for such electrodeposited primers are preferably high resistance type resins, thereby permitting the presence of enhanced amounts of extender pigment in the primer formulation. For electrodeposition, such primers are typically coated onto copper, cupriferous, zinciferous, or ferrous metal substrates.

The primer can also be applied to the treated substrate by other various methods, e.g., any of the methods which may be used for application of the hexavalent-chromium-containing liquid composition to the substrate, and which have been mentioned hereinabove. Generally to achieve a significant enhancement in augmenting corrosion resistance, the applied primer has a film thickness in excess of about 0.05 mil, but for economy, has a film thickness not substantially in excess of about 6 mils. For electroconductivity, especially for weldability, the primer is present in a thickness not substantially in excess of about 2 mils, and preferably for economy plus electroconductivity is present in a thickness of about 1 mil or less. It will usually provide a major amount, e.g., 60 percent or more of the total coating thickness. The primer is preferably applied to a treated substrate which has first been cooled to a temperature below about 200° F. after curing of the applied liquid composition, since substrate temperatures above about 200° F. may cause excessively rapid evaporation of the volatile components in the primer composition which can result in a discontinuous, applied film.

After application the primer is cured, which can often be accomplished simply by air drying at room temperature or by accelerated air drying at an elevated temperature such as 200° F. or higher. Additionally, such drying can be enhanced by catalytic action, for example with a metallic drier including lead, manganese, and cobalt or other metallic salts of organic acids, e.g., cobalt acetate. Such primers as are cured at room temperature by air drying can be ostensibly dry to the touch in as quickly as 10-12 minutes. Many of the weldable primers, e.g., those based on epoxy resin or epoxy/melamine resins for the binder component, are cured at an elevated temperature and for a period of time sufficient to vaporize volatile composition substituents, with the baking temperature being dependent upon the applied film thickness as well as on the particular binder present in the formulation.

For baking, a simple convection oven is preferred as opposed to infrared baking, since the capacity of the zinc and aluminum primers to reflect infrared radiation can lead to inefficient operation. Advantageously, for primers cured at elevated temperatures, they are baked at a temperature within the range of between about 350-1000° F. for a time of about 0.1-10 minutes. Temperatures below about 350° F. and times of less than about 0.1 minute can provide incomplete baking which, especially on mill finished coils, may lead to deleterious film removal, e.g., during coiling. Temperatures above about 1000° F. can lead to film degradation, e.g., charring of the binder solids, and baking times of greater than about 10 minutes are usually uneconomical. Typically, a zinc-rich primer having an applied film thickness of between about 0.1-3 mils is baked in an oven having an ambient air temperature of about 400°-700° F. and for a time of about 0.3-5 minutes.

The liquid composition residue which is further topcoated with a weldable primer may also form a particularly suitable substrate for paint deposition by electrocoating. This application may be used with metal substrates as well as other substrates, e.g., polysulfones and other synthetic polymer surfaces, which can withstand curing of the applied coating composition, typically at a temperature as low as about 300° F. or less for compositions in a t-butyl alcohol medium, or a more elevated temperature cure of 350°–400° F., or more, for compositions in aqueous medium.

The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and the like. Some of the well known resinous materials useful as film-forming materials include the polyester resins, alkyd resins, acrylate resins, hydrocarbon resins, and epoxy resins, and such materials can be reacted with other organic monomers and/or polymers including hydrocarbons such as ethylene glycol, monohydric alcohols, ethers, and ketones.

Of particular interest are polycarboxylic acid resins which can be solubilized with polyfunctional amino compounds and include the siccative oil-modified polybasic acids, esters or anhydrides which can be further reacted with divinyl benzene for example or acrylic acid and esters as well as polymerizable vinyl monomers. Such mention of suitable baths for electrodeposition is made herein by way of example and should not be construed as limiting. More exhaustive discussions of such film-forming systems have been set forth, for example, in U.S. Pats. 3,304,250 and 3,455,805.

Also, substances of particular interest, for example in the automotive industry, are the anodically deposited film-forming materials which have gained considerable acceptance in this field and are exemplified by U.S. Pat. 3,230,162. However, the broad scope to which the electrodeposition of film-forming materials relates, includes the deposition of such materials on anodic or cathodic substrates, and by means of various techniques for passage of current through a bath, including even intermittent pulsed current. After electrodeposition and removal of the coated substrate from the bath, curing of the film-forming materials is performed. The time and temperature of curing will be dependent upon the film-forming materials present, but is typically an air cure at room temperature or a forced cure at a temperature up to 500° F. and for times up to 60 minutes, at more reduced temperatures.

After coating by any of the methods of the present invention, the resulting coated substrate can be further topcoated with any suitable paint, i.e., a paint, primer, enamel, varnish, or lacquer. Such paints may contain pigment in a binder or can by unpigmented, e.g., generally cellulose lacquers, rosin varnishes, and oleoresinous varnishes, as for example tung oil varnish. The paints can be solvent reduced or they may be water reduced, e.g., latex or water-soluble resins, including modified or soluble alkyds, or the paints can have reactive solvents such as in the polyesters or polyurethanes. Additional suitable paints which can be used include oil paints, including phenolic resin pants, solvent-reduced alkyds, epoxys, acrylics, vinyl, including polyvinyl butyral and oil-wax-type coatings such as linseed oil-paraffin wax paints. The paints may be applied as mill finishes.

When reference is made herein to the application of a thin film of weldable primer prior to welding of the substrate, it is to be understood that the subsequent welding under consideration can be spot welding, i.e., localized electrical resistance welding, or seam welding such as with roller electrodes. Typically spot welding may be performed with copper electrodes at electrode loads from about 100 to about 5,000 pounds, and at 4–5 volts and about 10,000–17,000 amps operating conditions, with a weld time, in cycles, from about 4 to about 400 based on a 60-cycle frequency. When the weldable substrate is susceptible to coating on more than one surface, e.g., a sheet or strip of ferruginous material, the undercoat composition can be applied and cured on all surfaces, and the topcoat composition may be applied only to those surfaces which will be in close proximity or direct contact with the welding electrodes.

The following examples show ways in which the invention has been practiced but should not be construed as limiting the invention. In the examples the following procedures have been employed.

PREPARATION OF TEST PANELS

Steel test panels (4" x 12", and all being cold rolled, low carbon steel panels) are cleaned by dipping into water, or by spraying with water, which has incorporated therein 2–5 ounces of cleaning powder per gallon of water. The cleaning powder is 25% by weight of tetrasodium pyrophosphate, 25% by weight of disodium phosphate, and the balance sodium hydroxide, or such cleaning powder is 25 weight percent tripotassium phosphate and 75 weight percent potassium hydroxide. The bath is maintained at a temperature of about 150°–180° F. After this cleaning, the panels can be scrubbed with a brush or a dry cleaning pad which is a porous, fibrous pad of synthetic fiber impregnated with abrasive. Following the cleaning, or cleaning plus scrubbing, the panels are rinsed with warm water.

CORROSION RESISTANCE TEST (ASTM B–117–64)

Corrosion resistance of coated panels is measured by means of the standard salt spray (fog) test for paints and varnishes, ASTM B–117–64. In this test, the test panels are placed in a chamber kept at constant temperatures where they are exposed to a fine spray (fog) of a 5% salt solution for specified periods of time, rinsed in water and dried. The extent of corrosion and film removal on the test panels are then compared one with the other by visual inspection.

EXAMPLE 1

Two test panels are prepared as described above and are dipped into a bath containing 40 grams per liter of $CrO_3$ supplied by chromic acid as well as 0.5 gram per liter of polyoxyethylated nonylphenol, with the balance distilled water. After dipping, the panels are removed from the bath, excess composition drained from the panels, and immediately cured in an air-circulating oven, for a time shown in the table below, to a substrate temperature of about 450° F.

After cooling, these two panels are coated with a zinc-rich primer having at first a weight per gallon of 23.1 lbs., an initial solids volume of 50 percent, and containing initially 84.5 weight percent of non-volatiles. Prior to use, this primer is reduced to a viscosity of 45 seconds as measured on a No. 4 Ford cup with an aromatic solvent prepared synthetically from petroleum and having a flash point of 145°–150° F. Primer coated panels, which panels include two panels prepared, i.e., scrubbed and cleaned, as described hereinbefore but without the chromic acid treatment, are all cured for 3 minutes in an air-circulating oven to a metal substrate temperature of 425° F. Primer coating thickness measures 0.5 mil for each panel.

All four panels, that is, the two primer coated panels which have been first treated and the two primer coated panels that have been just scrubbed and cleaned, are subjected to the same corrosion resistance test described hereinbefore. Before such testing, to determine the development of corrosion from an abraded area of the coating, each panel is scribed with an "X" configuration with the scribe lines being made through the coating to expose the underlying metal before the corrosion resistance test is performed. The results of such testing as well as the duration of the test are shown in the table below as "salt spray" data. The percent rust described is made by visual inspection after removal of the panels from the test. Rust in the field is rust over the face of the panel surface and rust at the scribe is rust along the lines cut through the panel coating as described hereinabove.

TABLE 1

| Panel No. | Pretreatment | Pretreatment cure time in minutes | Primer cure time in minutes | 168 hrs. salt spray resistance | |
|---|---|---|---|---|---|
| | | | | Percent red rust at scribe | Percent red rust in field |
| 1 | No | | 3 | 70 | 50 |
| 2 | No | | 3 | 70 | 40 |
| 3 | Yes | 3 | 3 | 30 | Tr |
| 4 | Yes | 3 | 3 | 10 | Tr |

NOTE.—Tr=Trace.

The results from the above table thus demonstrate the desirable enhancement in corrosion protection obtained by the combination of the weldable primer applied over the chromic acid liquid compositions. Although corrosion protection can be provided by the primer alone, when the pretreatment is used in combination with the weldable primer, all panels achieve excellent corrosion resistance not only along scribe lines but also across the panel face.

EXAMPLE 2

Test panels are prepared as described above and four panels, referred to herein as "bare steel panels" are selected for testing or treatment plus testing. Two of the bare steel panels are coated with chromic acid by dipping and curing in the manner described in Example 1. One of these treated panels plus an additional bare steel panel are then coated with the zinc-rich primer described in Example 1. This primer coating is likewise applied and cured to these two panels in the manner described in Example 1.

The panels thus prepared for testing are one bare steel panel, one panel with only the initial surface treatment, one panel with only the primer, and lastly, a panel with the initial surface treatment plus the primer coating over such treatment. All panels are subjected to the salt spray testing in the manner described hereinbefore. For each panel the test is determined to be ended when the panel, by visual inspection, exhibits first red rust on the face of the panel. The results of such testing are shown in the table below.

TABLE 2

| Panel*: | First red rust in salt spray, hour |
|---|---|
| Bare steel | <1 |
| Bare steel plus pretreatment | <1 |
| Bare steel plus primer | 48 |
| Bare steel plus pretreatment plus primer | 168 |

*The primer coated panels have 0.5 mil paint thickness.

In addition to the above tabulated results, the panel containing the initial surface treatment plus the subsequent primer coating is maintained in the salt spray test for 216 hours at which time such panel is noted to have only about 3 percent red rust on the face of the panel. The results from the above table and the subsequent extended testing of the one panel thus clearly demonstrate the desirable enhancement in corrosion protection obtained by the combination of the chromic acid pretreatment when used in conjunction with the weldable primer.

Corrosion protection for the bare steel panels or the bare steel panels with the initial surface treatment is comparably very poor. The protection for the primer alone over the bare steel although much greater than for the initial surface treatment nevertheless lasts only about two days to first rust. However, when the initial surface treatment is used in combination with the primer the corrosion protection to first rust for the panel is extended to greater than three times beyond that of the panel with the primer coating only, even though the initial surface treatment alone will provide less than an hour of protection to first red rust on the face of the panel.

EXAMPLE 3

Additional test panels, referred to hereinbelow as "coupons," containing the initial surface treatment in an amount of about 20 milligrams per square foot, as well as the primer coating having a cured film thickness of 0.5 mil are subjected to electrical resistance spot welding. This is performed with copper electrodes at an electrode gap of ⅜ inch using a slow closure rate, an electrode pressure of 550 pounds, and using a weld time of 24 half cycles based on a 60 cycle frequency, and a weld heat of 12,500 amp-second. After welding the coupons pull a good "button" in the peel test.

In this test two coupons which have been welded together by at least one spot weld are peeled apart past the weld, thereby tearing the welded spot from one of the coupons. Hence, one coupon has a hole at the spot weld and the other coupon has a "button" of metal at the place of the spot weld. The electrodes for the welding have a diameter of 0.250 inch. The button pulled from the test coupon, measured across its narrowest apparent diameter with a micrometer calibrated for measuring to the nearest 0.001 inch, must be virtually 0.250 inch across. Additionally, buttons measured in the same manner as the test approaches 2,000 spot welds must measure at least 0.220 inch across. In view of the pulling of acceptable buttons to the 2,000 spot weld, these coupons are considered to be highly suitable for such electrical resistance spot welding.

Additional test panels for comparative weldability are commercial panels containing an average weight of about 40–50 milligrams per square foot of a tightly adhering, corrosion inhibiting iron phosphate substrate coating. Such panels have met with general acceptance as a standard for performance when evaluation corrosion inhibiting coatings in, for example, the automotive and household appliance industries. These panels are primer coated with the zinc-rich primer described in Example 1 and after curing have a cured primer film thickness of 0.5 mil. These panels are subjected to electrical resistance spot welding as discussed hereinabove, but after merely six continuous spot welds they are not further weldable. Such showing constitutes complete failure for electrical resistance spot welding for such panels as compared with the excellent welding through 2,000 spot welds for test coupons coated with the composition of the present invention.

EXAMPLE 4

A test panel (C) is prepared as described in Example 1, except that the chromium is present in an amount of 20 g./l. of the bath. The panels are dried and then baked under infrared lamps at a substrate temperature reaching about 450° F. The panel (C) as well as an additional panel (B) are coated with the zinc-rich primer of Example 1 and in the manner of Example 1. Resulting panels contain a thickness of the primer topcoat of 0.5 mil for the panel (B) and 0.35 mil for the panel (C).

Both panels (B), and (C), as well as a clean steel panel (A) are all coated with a black-pigment electrocoat primer containing at first 40 percent of non-volatiles which before use is reduced with deionized water in a proportion of 1 part by volume paint to 3 parts by volume water. Panels are immersed in the electrocoat paint bath as anodes and paint is applied typically for 0.5 minute at 100 volts. Following removal of the panels from the electrocoating bath, all panels are typically baked for 20 minutes at a temperature of 400° F. After baking, all panels are scribed, the scribing is performed by cutting an "X" configuration on the face of the panel, the scribe lines being made through the coating to expose the underlying metal. The extent of corrosion along the scribe lines is made by visual inspection and through comparison among test panels.

All panels are subjected to the corrosion resistance test as described hereinbefore. In the table below the results of such corrosion resistance testing are shown. The results are presented as inches of failure of paint adhesion, to the nearest 1/32 of an inch, away from the scribe lines.

TABLE 3

| Panels | Undercoat | Primer thickness, in mils | Salt spray, 120 hours | |
|---|---|---|---|---|
| | | | Scribe | Face |
| A [1] | No | No primer | CLA | CLA. |
| B | No | 0.5 | 2.5–3.5/32 | #8, F.[2] |
| C | Yes | 0.35 | 0–0.5/32 | None. |

[1] Electrocoated only.
[2] Numbers refer to blisters in accordance with ASTM D-714-56, and F=few.
NOTE.—CLA=Complete loss of paint adhesion.

As can be seen from the above results, the electrocoat primer alone does not provide any desirable paint adhesion. Also, the zinc-rich primer alone under the electrocoat can offer unacceptable corrosion resistance, i.e., along the scribe lines in salt spray testing at a thickness as great as 0.5 mil for the primer. However, electrocoated panels which first contain the undercoat and then the zinc-rich primer before electrocoating show excellent corrosion resistance. Thus the combination of the undercoat with the weldable primer topcoat, affords an excellent substrate for subsequent deposition of electrocoat primer. Further, where undercoats alone from chromic-acid-containing baths are directly electrocoated, corrosion resistance can be very unsatisfactory, especially after 120 hours of salt spray testing.

What is claimed is:
1. The method of preparing a weldable substrate for extended electrical resistance welding and having desirable corrosion resistance, which method comprises:
  (1) establishing on said surface a substantially resin-free hexavalent-chromium-containing composition residue from a liquid composition consisting essentially of a hexavalent-chromium-providing material, supplied by at least about 80 weight percent chromic acid, and liquid medium, and in an amount sufficient to provide above about 5 milligrams per square foot of coated substrate of chromium, and not substantially above about 20 milligrams per square foot of chromium, thereby preparing a treated metal surface;
  (2) establishing on the resulting treated metal surface a topcoat primer composition in an amount providing not substantially in excess of about 2 mils of primer, said primer comprising a particulate, electrically conductive pigment in a vehicle, wherein said electrically conductive pigment is selected from the group consisting of aluminum, copper, cadmium, steel, magnetite, carbon, and zinc; and,
  (3) curing said topcoat composition thereby preparing said substrate for welding with a coating providing corrosion resistance and weldable electroconductivity.

2. The method of claim 1 wherein said topcoat composition contains between about 30–80 volume percent of zinc pigment in admixture with a binder comprising a material selected from the group consisting of polystyrene, chlorinated rubber, isomerized rubber, polyvinyl acetate, epoxy resin, polyamide resin combined with epoxy resin, and polyvinyl chloride-polyvinyl acetate copolymers.

3. The method of claim 1 wherein said treated metal surface is at least in part established by heating said substrate containing liquid composition at a temperature not substantially above about 900° F. and for a time of at least about 0.2 second and said substrate after establishing said topcoat composition thereon is heated at a temperature not substantially in excess of about 1000° F. and for a time of at least about 0.1 minute.

4. A weldable metal substrate prepared for electrical resistance welding according to the method of claim 1.

5. The method of preparing a coated and welded metallic article, wherein the welding is electrical resistance welding which method comprises:
  (1) establishing on said surface a substantially resin-free hexavalent-chromium-containing composition residue from a liquid composition consisting essentially of hexavalent-chromium-providing material, supplied by at least about 80 weight percent chromic acid, and liquid medium, and in an amount sufficient to provide above about 5 milligrams per square foot of coated substrate of chromium, and not substantially above about 20 milligrams per square foot of chromium, thereby preparing a treated metal surface;
  (2) establishing on the resulting treated metal surface a topcoat primer composition in an amount providing not substantially in excess of about 2 mils of primer, said primer comprising a particulate, electrically conductive pigment in a vehicle, wherein said electrically conductive pigment is selected from the group consisting of aluminum, copper, cadmium, steel, magnetite, carbon, and zinc;
  (3) curing said topcoat composition thereby preparing said substrate for welding with a coating providing corrosion resistance and weldable electroconductivity;
  (4) contacting at least a portion of said one article with another article of metal to be welded;
  (5) passing an electrical resistance welding current through said articles of metal and said coating thereon at the zone selected for welding; and
  (6) fusing said articles together in said zone of said welding.

6. The method of claim 5 wherein said liquid composition is dried after application of same to said surface, and the dried composition plus said topcoat composition, after application over said dried composition, are both cured by heating said substrate at a temperature not substantially in excess of about 1,000° F. and for a time of at least about 0.1 minute.

7. A welded article prepared according to the method of claim 5.

8. The method of preparing a corrosion resistant, welded metal assembly having an electrocoat painted surface, which method comprises:
  (1) establishing on said surface a substantially resin-free hexavalent-chromium-containing composition residue from a liquid composition consisting essentially of a hexavalent-chromium-providing material, supplied by at least about 80 weight percent chromic acid, and liquid medium, and in an amount sufficient to provide above about 5 milligrams per square foot of coated substrate of chromium, and not substantially above about 20 milligrams per square foot of chromium thereby preparing a treated metal surface;
  (2) establishing on the resulting treated metal surface a topcoat primer composition in an amount providing not substantially in excess of about 2 mils of primer, said primer comprising a particulate, electrically conductive pigment in a vehicle, wherein said electrically conductive pigment is selected from the group consisting of aluminum, copper, cadmium, steel, magnetite, carbon, and zinc;
  (3) curing said topcoat composition thereby preparing said substrate for welding with a coating providing corrosion resistance and weldable electroconductivity;
  (4) contacting at least a portion of the article having the prepared substrate with another article of metal to be welded;
  (5) passing an electrical resistance welding current through said articles of metal and said coating theron at the zone selected for welding, and fusing said articles together at said zone of welding, thereby forming said welded metal assembly;

(6) immersing into a bath of electrocoat paint containing an electrode the resulting assembly and preparing same as an electrode; and (7) electrolyzing said bath of electrocoat paint.

9. A welded and electrocoated assembly prepared by the process of claim 8.

References Cited

UNITED STATES PATENTS

| | | | |
|---|---|---|---|
| 3,242,130 | 3/1966 | Jackopin | 117—75 X |
| 3,318,716 | 5/1967 | Schuster et al. | 148—6.2 X |
| 3,351,504 | 11/1967 | DeHart | 148—6.2 X |
| 2,846,342 | 8/1958 | Curtin I | 148—6.16 |
| 2,901,385 | 8/1959 | Curtin II | 148—6.16 |
| 3,464,906 | 9/1969 | Ridley | 204—181 |
| 3,408,278 | 10/1968 | Stoodley | 204—181 |
| 3,502,511 | 3/1970 | Forsberg | 148—6.15 Z |
| 3,454,483 | 6/1969 | Freeman | 148—6.15 ZX |

RALPH S. KENDALL, Primary Examiner

U.S. Cl. X.R.

117—131, 132 C; 148—31.5; 204—181; 29—488